July 25, 1961     J. E. BORAH     2,993,722
BUMPER, BUMPER-GUARDS AND YIELDABLE MOUNTING THEREFOR
Original Filed May 16, 1956     2 Sheets-Sheet 1

*INVENTOR.*
JOHN E. BORAH
BY M. A. Hobbs
ATTORNEY

United States Patent Office 2,993,722
Patented July 25, 1961

2,993,722
BUMPER, BUMPER-GUARDS, AND YIELDABLE MOUNTING THEREFOR
John E. Borah, 815 Mishawaka Ave., Mishawaka, Ind.
Original application May 16, 1956, Ser. No. 585,315, now Patent No. 2,858,159, dated Oct. 28, 1958. Divided and this application Aug. 25, 1958, Ser. No. 759,834
2 Claims. (Cl. 293—71)

The present invention relates to vehicle bumpers and the like and more particularly to bumper guards or attachments and to a means for mounting bumpers and said guards on vehicles. This is a division of application Serial No. 585,315 filed May 16, 1956 now Patent No. 2,858,159 dated October 28, 1958.

In this day and age of combined forces such as increased present day life tensions and the constantly increased number of motor vehicles on the streets and highways, the driving of automobiles has become hazardous and on many occasions even minor collisions result in damages to automobiles and serious injuries to human lives. Many of these dangers are due to the fact that conventional construction of automobile bumpers and bumper-guards does not provide effective cushioning and shock absorbing elements when vehicles collide. Therefore, the primary object of the present invention is to provide life saving safety features through means of an effective impact shock absorbing and positive cushioning element for motor car bumpers and bumper-guards.

In normal city driving and curb parking automobiles often collide with one another, usually bumper to bumper or bumper guard to bumper guard. These bumps and knocks frequently produce deep scratches and cracks in the plating on the bumpers and guards which expose the base metal to the weather and to road water and dirt. The exposed base metal corrodes rapidly from the water and dirt which often contain salt and other highly corrosive chemicals producing a permanent discoloration in the finish of those members. In cases of more severe bumping conventional bumper guards are sometimes displaced or torn completely from spot welded mounting fixtures holding them on the bumper, often causing substantial and irreparable damage to the bumper plating and possibly denting or otherwise seriously damaging the base metal.

Another object of the present invention therefore is to provide a mounting construction of metal and rubber bumpers and bumper-guards, which will not only yield during any impact of motor vehicle collision but which will more effectively withstand blows from bumping and knocking of other vehicles than conventional rigid spot welded guard mountings.

Another object of the invention is to provide a bumper guard which can readily be assembled and mounted on a vehicle and easily removed, serviced and replaced without the use of special tools or skill on the part of the mechanic.

Still another object of the invention is to provide a relatively simple and easily mountable bumper and bumper guard attachment for cushioning blows of colliding vehicles.

A further object of the invention is to provide a sturdy, resiliently mounted, bumper guard for giving maximum safety and protection to colliding automobiles, particularly during normal city driving and curb parking.

Additional objects and advantages will become apparent from the following description and accompanying drawings, in which.

Figure 1:
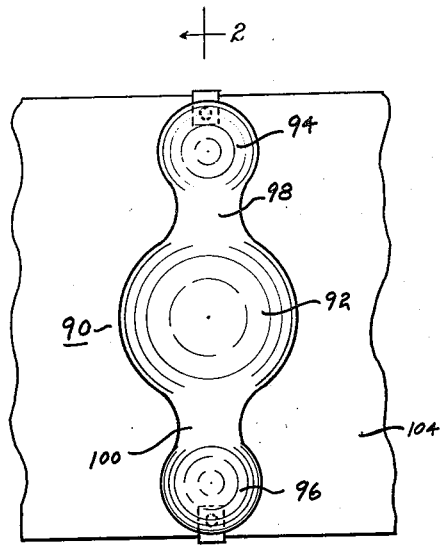
FIGURE 1 is a front elevational view of one embodiment of my bumper guard shown as mounted on a conventional bumper.
Figure 2:
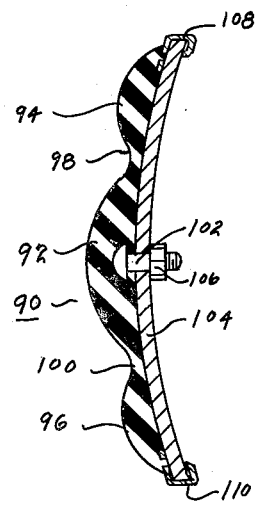
FIGURE 2 is a vertical cross sectional view of the bumper guard shown in FIGURE 1 taken on line 2—2 of said figure.

One embodiment of my invention is illustrated in FIGURES 1 and 2 wherein my bumper attachment is shown mounted on a conventional automobile bumper either front or rear. An element 90 consisting of three separate lobes 92, 94 and 96 connected by relatviely thin necks 98 and 100 is secured to the bumper at the center lobe 92 by a bolt 102 having its head embedded in said lobe and extending through a hole in the bumper 104. A nut 106 threaded onto the end of said bolt draws and holds the lobe firmly in contact with the front surface of the bumper. The upper lobe 94 is secured to the bumper by a hook 108 having one end embedded in said lobe and the other end hooked over the upper edge of the bumper. The lower lobe 96 is secured to the bumper by a hook 110 embedded in said lobe and hooked under the lower edge of the bumper. In order for the two hooks to be held securely in place over the respective edges, the overall height of element 90 is somewhat less than the height of the bumper, hence in order to place the hooks over the edges of the bumper in mounting the element it is necessary to stretch said element a slight amount. The resiliency of the material from which the element is made urges the hooks firmly against the edges of the bumper. Necks 98 and 100 have purposely been made relatively thin so that the stretching required to place the hooks over the edges of the bumper will occur at those points.

Figure 3:
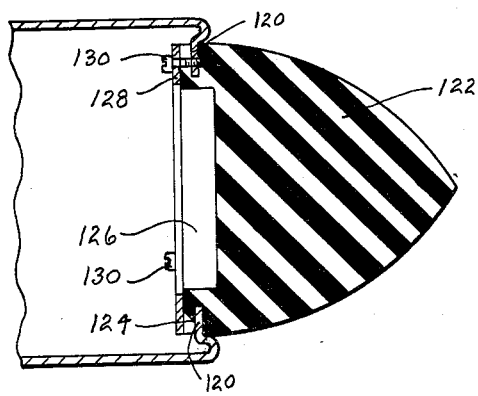
FIGURE 3 is a vertical cross sectional view of a modified form of a bumper attachment.

The bumper guards on some automobiles have parking or back-up lights mounted therein. Since these lights are usually optional equipment the lights are sometimes omitted and the ports provided for them are covered with disc shaped metal plates which have no utility except to close the holes. Another embodiment of the present invention utilizes the space provided for the lights for a resilient bumper attachment, such as that shown in FIGURE 3. In the bumper guard shown as in most conventional bumper guards of this type, there is an internal annular flange 120 to which the light reflector and lens are attached. In the present construction a bullet-shaped element 122 of rubber or the like is provided with an annular groove 124 around its periphery near the inner end for receiving annular flange 120. To install element 122 in the light port the element is distorted by squeezing or crimping sufficiently to permit the element to slip into the port and groove 124 over flange 120. This mounting operation is greatly facilitated by providing a recess 126 in the inner end of the element to give the material adjacent groove 124 greater flexibility. While element 122 will normally remain in place in the port without any additional securing means, it may be desirable to positively secure the element in place by a retaining device such as that shown in FIGURE 3 consisting of a metal ring 128 held by a plurality of screws 130 extending through said ring and internal margin of the element into flange 120.

Figure 4:
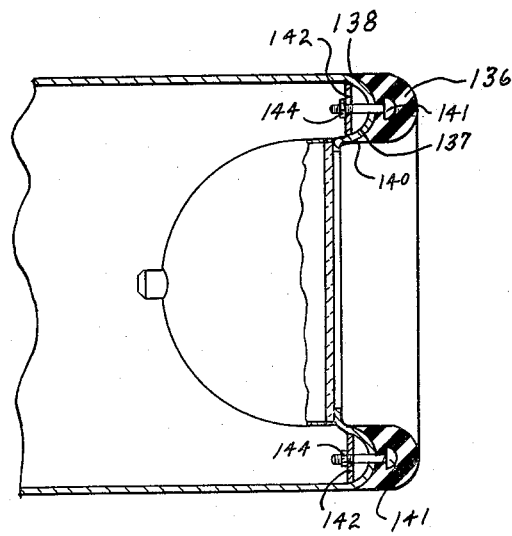
FIGURE 4 is a vertical cross sectional view of a bumper attachment for the housing of a parking or back-up light or for metal defining the exhaust port in an automobile bumper.

In FIGURE 4 the resilient bumper attachment is mounted on the rim around the light in the bumper guard. Element 136 is an annular member formed on its inner side to fit the contour of the rim 137 and having thin edges 138 and 140 blending into the lines of the bumper guard. This element is secured to the rim of the guard by a plurality of small bolts 141 having their heads embedded in the element and extending through holes in the rim to and through a ring 142 seated inside the guard behind the rim 137. Nuts 144 threaded onto the bolts draw and hold the element firmly against the rim and ring 142 firmly seated on the internal surface of the guard.

Figures 5, 6:
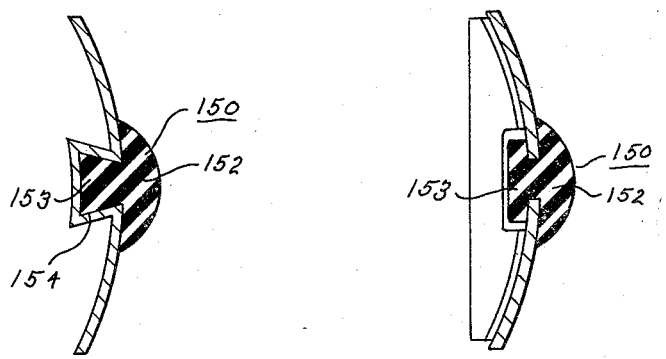
FIGURES 5 and 6 are vertical cross sectional views of a bumper and bumper guard or attachment showing the manner in which said guard or attachment is secured in place on the bumper.

FIGURES 5 and 6 illustrate a further modified form of a bumper attachment or element. In this embodiment an element 150 extends the full length of the bumper from one side of the automobile to the other and may be placed either on the front or rear bumper. This element consists of a rib portion 152 which projects beyond the surface of the bumper and an anchoring portion 153 adapted to seat in a longitudinal slot 154 extending the full length of the bumper. This type of element can be mounted by threading it into the slot from one end. A lubricant such as a soap solution or rubber cement can be used to facilitate the threading operation. The slot into which the anchoring portion is seated can be formed integrally in a single bumper member, as shown in FIGURE 5, or it can be formed by spacing two longitudinal members of the bumper as shown in FIGURE 6.

In all of the modifications shown and described herein various colored materials can be used for the elements. These colors would normally be selected to match or blend with the coolrs on the particular automobiles on which they are mounted. Another particular advantage of the present bumper elements is that they can be coated with a fluorescent paint and hence not only serve as a means of preventing damage to the vehicles when they collide but also as a reflector to improve the visibility of the vehicle at night.

Various changes and further modifications can be made in the present invention to adapt it to various installations.

I claim:
1. An attachment for a bumper member having a hole therein and an annular flange defining said hole, comprising a relatively thick bullet shaped element having an outwardly facing annular groove around the large end thereof for receiving the flange around said hole, a cylindrical recess spaced inwardly from said groove to render the portion defining said groove flexible and deformable, a ring abutting the rear face of said element, and means passing through said ring and flange to clamp the marginal portion of said element against said flange.

2. An attachment for a bumper member having a hole therein and a rim encircling said hole, comprising a resilient ring-like element conforming generally to said rim and adapted to fit thereon, a ring behind said rim, and means having one end embedded in said resilient element and extending through said rim and said ring to secure said element to said rim.

References Cited in the file of this patent

UNITED STATES PATENTS

| | | |
|---|---|---|
| 1,665,780 | Hamburger | Apr. 10, 1928 |
| 2,031,217 | Kernspecht | Feb. 18, 1936 |
| 2,050,435 | Howard | Aug. 11, 1936 |
| 2,062,313 | Jandus et al. | Dec. 1, 1936 |
| 2,144,167 | Sanders | Jan. 17, 1939 |
| 2,188,082 | Imhofe | Jan. 23, 1940 |
| 2,614,877 | Benian | Oct. 21, 1952 |
| 2,624,607 | Weigand | Jan. 6, 1953 |
| 2,730,396 | Johnson | Jan. 10, 1956 |
| 2,829,915 | Claveau | Apr. 8, 1958 |

FOREIGN PATENTS

| | | |
|---|---|---|
| 724,467 | France | Jan. 29, 1932 |
| 595,278 | Germany | Apr. 5, 1934 |